(12) United States Patent
Ferreira

(10) Patent No.: US 9,534,660 B2
(45) Date of Patent: Jan. 3, 2017

(54) CLAMPING MEMBERS AND CLAMPING DEVICES

(75) Inventor: Andre Ferreira, Sheffield (GB)

(73) Assignee: GRIPPLE LIMITED (GB)

( * ) Notice: Subject to any disclaimer, the term of this patent is extended or adjusted under 35 U.S.C. 154(b) by 0 days.

(21) Appl. No.: 13/820,767

(22) PCT Filed: Sep. 8, 2011

(86) PCT No.: PCT/GB2011/001314
§ 371 (c)(1),
(2), (4) Date: Mar. 5, 2013

(87) PCT Pub. No.: WO2012/035290
PCT Pub. Date: Mar. 22, 2012

(65) Prior Publication Data
US 2013/0160245 A1  Jun. 27, 2013

(30) Foreign Application Priority Data

Sep. 14, 2010 (GB) .................................. 1015326.0
Sep. 6, 2011 (GB) .................................. 1115365.7

(51) Int. Cl.
*F16G 11/04* (2006.01)
*F16G 11/10* (2006.01)

(52) U.S. Cl.
CPC ............... *F16G 11/10* (2013.01); *F16G 11/04* (2013.01); *F16G 11/106* (2013.01); *Y10T 24/396* (2015.01); *Y10T 24/3978* (2015.01)

(58) Field of Classification Search
CPC ........ F16G 11/10; F16G 11/04; H01R 4/5041; H01R 4/5075; H01R 4/5083; H01R 4/52
(Continued)

(56) References Cited

U.S. PATENT DOCUMENTS 2,828,147 A * 3/1958 Peiffer .................... 285/421
3,091,829 A   6/1963 Heck
(Continued)

FOREIGN PATENT DOCUMENTS

CA   2710568      9/2009
CL   199700537    3/1996
(Continued)

OTHER PUBLICATIONS

Combined Search and Examination Report which issued in connection with corresponding application No. GB1115365.7 on Jan. 9, 2012.
(Continued)

*Primary Examiner* — Robert J Sandy
*Assistant Examiner* — David Upchurch
(74) *Attorney, Agent, or Firm* — Clark Hill PLC; James R. Foley

(57) ABSTRACT

A clamping arrangement which includes an elongate member having a plurality of strands wound around one another in a plurality of turns of each strand. The clamping arrangement further includes a clamping device which includes a clamping member for clamping the elongate member. The clamping member has an engaging means for engaging the elongate member. The engaging means is configured to engage half or more of the total number of strands forming the elongate member. The clamping device further includes a fixed reaction member, and urging means to urge the clamping member towards the reaction member. When the elongate member is received between the clamping member and the reaction member, the reaction member provides a reaction against the elongate member to clamp the elongate member in the clamping device.

17 Claims, 4 Drawing Sheets

(58) Field of Classification Search
USPC .................. 24/115 G, 115 M, 155 R, 135 A,
136 A, 24/136 R
See application file for complete search history.

(56) References Cited

U.S. PATENT DOCUMENTS

| | | | | |
|---|---|---|---|---|
| 3,628,221 | A * | 12/1971 | Pasbrig | ............................. 403/18 |
| 3,758,922 | A | 9/1973 | Field | |
| 3,776,586 | A * | 12/1973 | Ahlgren et al. | ........... 294/102.1 |
| 3,816,012 | A | 6/1974 | Hubbell | |
| 4,450,603 | A | 5/1984 | Hirsch | |
| 4,455,717 | A * | 6/1984 | Gray | ............................ 24/115 R |
| 4,541,149 | A * | 9/1985 | Jensen | ........................ 24/134 R |
| 4,634,205 | A | 1/1987 | Gemra | |
| 4,640,538 | A | 2/1987 | Brammall | |
| 5,015,023 | A | 5/1991 | Hall | |
| 5,022,125 | A | 6/1991 | Biass | |
| 5,147,145 | A * | 9/1992 | Facey et al. | ................... 403/314 |
| 6,058,574 | A * | 5/2000 | Facey et al. | ................. 24/136 R |
| 6,076,236 | A | 6/2000 | DeFrance | |
| 6,978,520 | B2 * | 12/2005 | Falany | ............................. 24/171 |
| 8,112,847 | B2 * | 2/2012 | Shawcross et al. | ......... 24/136 R |
| 2003/0115723 | A1 * | 6/2003 | Shuey | ........................... 24/136 R |
| 2007/0074378 | A1 * | 4/2007 | Tamm et al. | ............... 24/136 L |
| 2008/0086849 | A1 * | 4/2008 | McKee | ....................... 24/136 R |

FOREIGN PATENT DOCUMENTS

| | | |
|---|---|---|
| CL | 199803007 | 12/1998 |
| CL | 199901241 | 6/1999 |
| DE | 36 01 233 | 7/1986 |
| DE | 3601233 | 7/1986 |
| DE | 199 18 792 | 12/2000 |
| EP | 1 555 479 | 7/2005 |
| GB | 2 240 581 | 8/1991 |
| GB | 2 415 012 | 12/2005 |
| JP | 04-80586 | 9/1928 |
| JP | 56-162339 | 12/1981 |
| JP | 60-11259 | 3/1985 |
| JP | 02-273128 | 11/1990 |
| JP | 2000-505535 | 5/2000 |
| MX | 2010008629 | 8/2010 |
| WO | 97/36123 | 10/1997 |
| WO | 2009/112806 | 9/2009 |
| WO | WO2009/112806 | 9/2009 |

OTHER PUBLICATIONS

Examination Report which issued in connection with corresponding application No. GB11764238.9 on Sep. 8, 2014.
Further Examination Report which issued in connection with corresponding application No. NZ607786 on Oct. 8, 2014.

* cited by examiner

CLAMPING MEMBERS AND CLAMPING DEVICES

This invention relates to clamping members for use in clamping devices. This invention also relates to clamping devices.

The use of clamping members in clamping devices is known. An example of such a clamping device is disclosed in GB patent specification No. 2240581.

According to one aspect of this invention, there is provided a clamping member for clamping an elongate member to a clamping device, the elongate member comprising a plurality of strands wound around one another in a plurality of turns of each strand, wherein each strand has substantially the same pitch as each other strand, and the clamping member has engaging means for engaging the elongate member, the engaging means being configured to engage half or more of the total number of strands forming the elongate member.

According to one aspect of this invention, there is provided a clamping arrangement comprising an elongate member having a plurality of strands wound around one another in a plurality of turns of each strand, a clamping device comprising a clamping member for clamping the elongate member, wherein the clamping member has an engaging means for engaging the elongate member, the engaging means being configured to engage half or more of the total number of strands forming the elongate member, and the clamping device further includes a reaction member, and urging means to urge the clamping member towards the reaction member, and wherein when the elongate member is received between the clamping member and the reaction member, the reaction member provides a reaction against the elongate member to clamp the elongate member in the clamping device.

In the embodiment described herein, the reaction member and the clamping member extending over half or more of the total number of strands in the elongate member provides the advantage that the elongate member is clamped tightly between the clamping member and the reaction member, and the risk of the elongate member being cut by the clamping member is minimised. The reaction member may be a fixed reaction member.

When the elongate member is clamped between the clamping member and the reaction member, each strand of the elongate member is engaged by one or both of the clamping member and the reaction member.

Each strand may be in the form of a helix. The elongate member may be a wire, cable, rope or the like.

The clamping member may have a body. The engaging means may be provided on the body.

In one embodiment, where the elongate member has six strands, the engaging means may engage three or more of the strands.

Desirably, the engaging means may be configured to engage two thirds or more of the total number of strands forming the elongate member. In one embodiment, where the elongate member has six strands, the engaging means may engage four or more of the strands.

Desirably, the engaging means may be configured to engage at least three quarters of the total number of strands forming the elongate member. In one embodiment, where the elongate member has eight strands, the engaging means may engage six or more of the strands.

More desirably, the engaging means may be configured to engage all of the strands of the elongate member. In one embodiment, where the elongate member has six strands, the engaging means may engage all six strands.

The engaging means may have a dimension which may be substantially equal to 50% or more of the pitch of the strands in the elongate member. The engaging means may be configured to engage the elongate member, such that the aforesaid dimension of the engaging means extends along the elongate member. The dimension may be the length of the engaging means.

As used herein, the word "pitch" means the length of one complete turn of a strand measured along the main longitudinal axis of the elongate member.

The aforesaid dimension of the engaging means is desirably substantially equal to 67% or more of the pitch of the strands. The aforesaid dimension of the engaging means is desirably substantially equal to 75% or more of the pitch of the strands. The aforesaid dimension of the engaging means is desirably substantially equal to 100% or more of the pitch of the strands.

The clamping member may comprise a preliminary engaging projection to initially engage the elongate member. The preliminary engaging projection may comprise a tooth on the engaging means. The clamping member may comprise a plurality of the aforesaid preliminary engaging projections, such as three preliminary engaging projections. Each preliminary engaging projection may comprise a respective tooth.

The engaging means may comprise an engaging surface, which may have with a plurality of gripping formations. The gripping formations may comprise serrations, wherein each serration extends across the engaging surface.

The clamping member may be elongate, having a length and comprising front and rear regions, the front region leading the rear region when the clamping member is urged into engagement with the elongate member, and the front region being thinner than the rear region. The clamping member may be in the form of a wedge. The engaging means may have an engaging length which is between approximately three fifths and approximately three quarters of the length of the clamping member.

The front region of the clamping member may be convexly curved to facilitate engagement of the engaging means with the elongate member. The curvature may extend from the front region to the engaging means. The curvature of the front region may extend between approximately one quarter and approximately one third of the length of the clamping member.

The clamping member may be movable between a clamping position and a release position. The engaging means may be configured to grip the elongate member when the clamping member is in the clamping position. The reaction member may be configured to allow adjustment of the position of the elongate member relative thereto when the clamping member is in the release position.

The reaction member may have a reaction surface to engage the elongate member. The reaction surface may be smoother than the engaging means of the clamping member, thereby to allow the aforesaid adjustment of the elongate member when the clamping member is in the release position.

According to another aspect of this invention, there is provided a clamping device for clamping an elongate member, the clamping device comprising a housing defining a passage to receive the elongate member, a clamping member as described above arranged in the housing to clamp the elongate member in the passage, and urging means to urge the clamping member towards the passage, wherein the clamping device includes a reaction member fixed relative to the housing to provide a reaction against the elongate member received in the passage when the clamping member is urged towards the passage to clamp the elongate member.

The passage may be defined by a reaction member and a reaction element arranged opposite one another and angled towards one another. The reaction member may comprise a wall. The reaction element may comprise a second wall.

The clamping device may define a pair of passages into each of which an elongate member can be received. The elongate members received in the respective passages may be different elongate members, or different regions of the same elongate member.

The clamping device may comprise a pair of clamping members, each of which being associated with a respective one of the passages. The clamping device may comprise a pair of urging means, each of which being arranged to urge a respective one of the clamping members towards the passage with which it is associated.

In one embodiment, the clamping device may have a single reaction member associated with each passage. The reaction member may have two surfaces, and each surface may provide a reaction against a respective elongate member in each passage.

In another embodiment, the clamping device may have two reaction members, each being associated with a respective one of the passages. Each, reaction member may comprise a respective wall. Each, reaction element may comprise a respective second wall. The, or each, wall may be part of the housing.

An embodiment of the invention will now be described by way of example only with reference to the accompanying drawings, in which.

Figure 1:
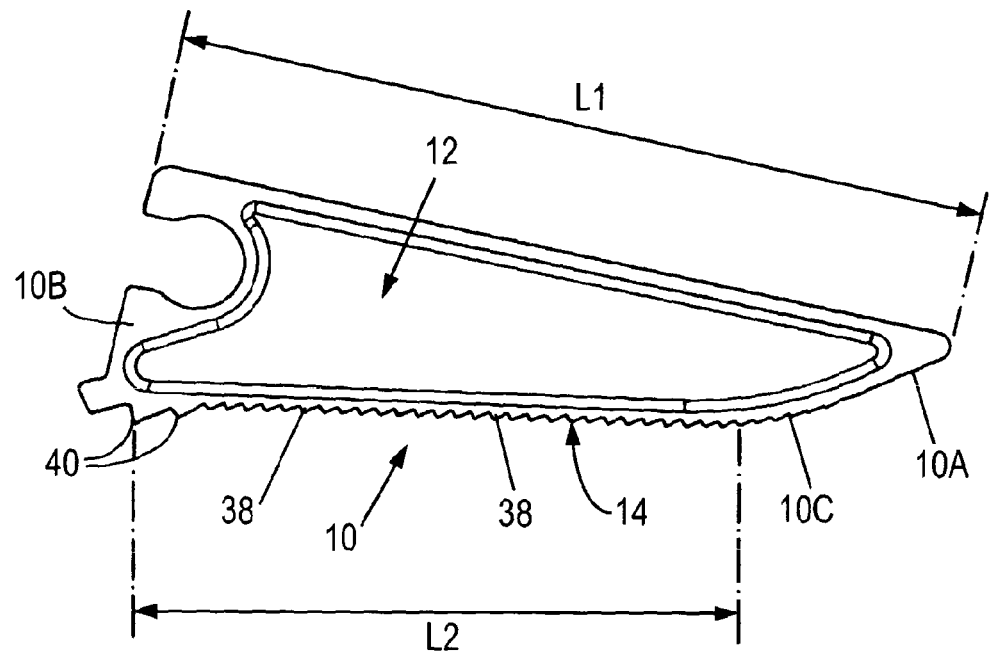
FIG. 1 is a side view of a clamping member.

A clamping member 10 for use as part of a clamping arrangement 100 is shown in FIG. 1. The clamping member 10 comprises a body 12, and engaging means on the body 12, the engaging means being in the form of an engaging surface 14. The clamping member 10 is generally in the form of an elongate wedge having a narrow front region 10A, and a wide rear region 10B.

Figure 2:
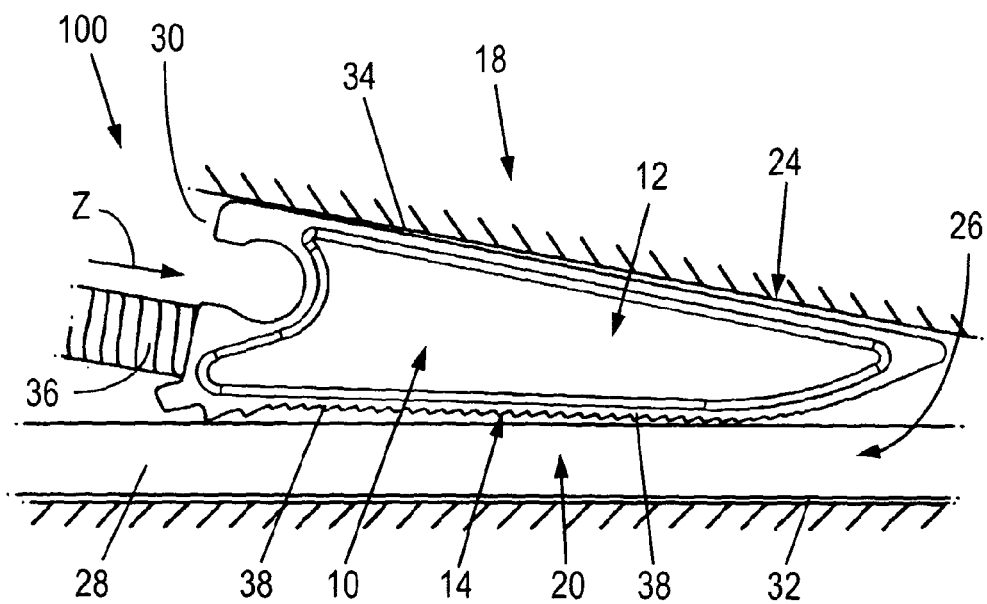
FIG. 2 is a diagrammatic view of a part of a clamping device incorporating a clamping member shown in FIG. 1.

FIG. 2 shows the clamping arrangement 100 comprising the clamping member 10, a clamping device 18 and an elongate member 20 in the form of a wire, cable, rope or the like. In FIG. 2, the clamping member 10 is shown in the clamping device 18, clamping the elongate member 20. Although not shown in FIG. 2, the elongate member 20 is formed of a plurality of strands 22A, 22B, 22C, 22D, 22E and 22F. The strands 22A to 22F are shown more clearly in FIG. 3, and discussed below.

Figure 5:
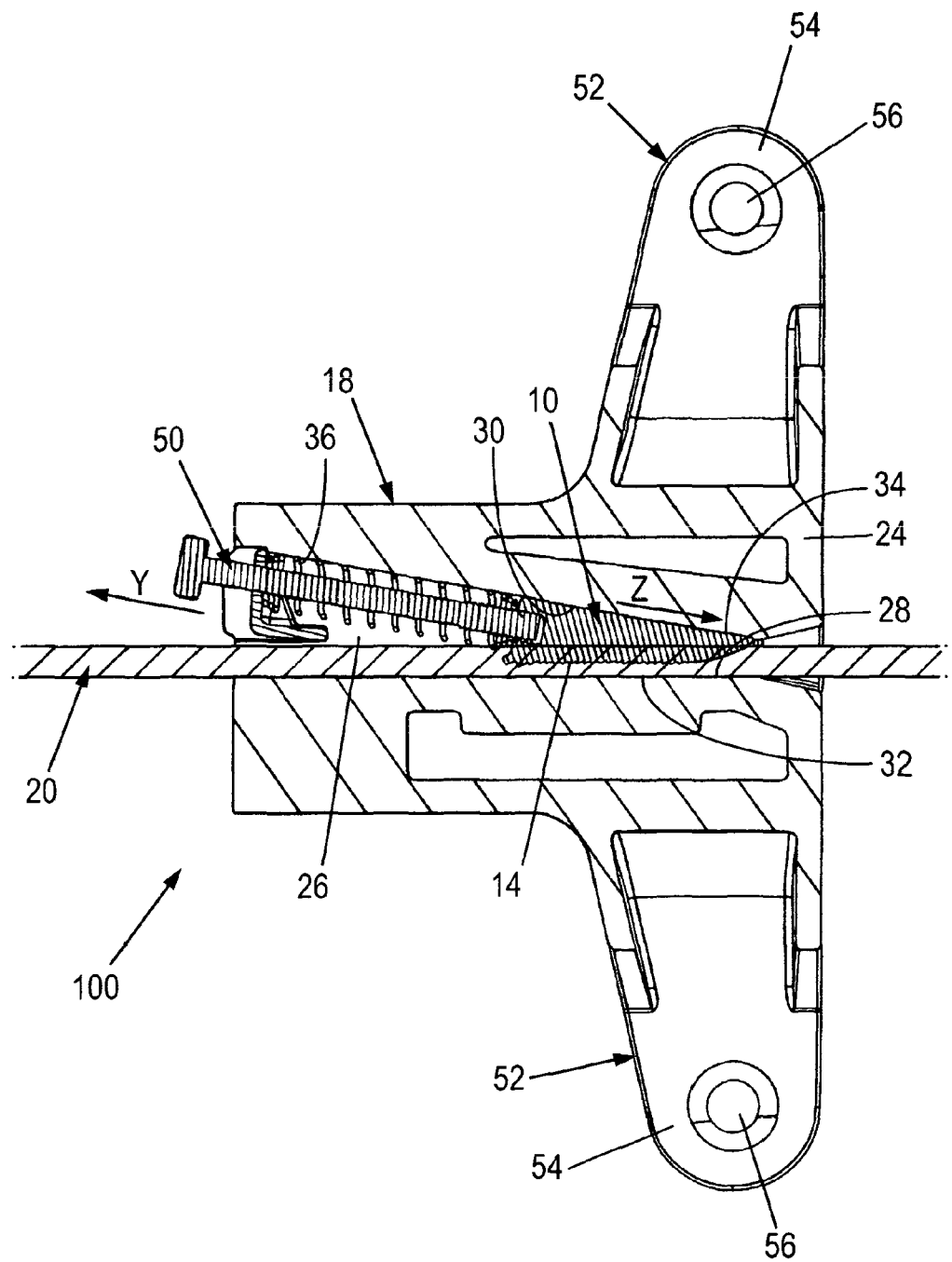
FIG. 5 is a sectional view of an embodiment of a clamping device.

A part of the clamping device 18 is shown diagrammatically in FIG. 2, and in more detail in FIG. 5. The clamping device 18 comprises a housing 24 defining a passage 26 for receipt of the elongate member 20 and the clamping member 10. The passage 26 has an article receiving channel 28 through which the elongate member extends, and a space 30 in which the clamping member 10 is held.

The passage is defined between a fixed reaction member in the form of a first wall 32, and a fixed reaction element in the form of a second wall 34 angled at an acute angle relative to the first wall 32. FIG. 2 shows the clamping device in use, and it can be seen that the elongate member 20 is received in the article receiving channel 28 and engages the first wall 32. The clamping member 10 is provided in the space 30 between the elongate member 20 and the second wall 34.

Urging means in the form of a compression spring 36 urges the clamping member 10 in the direction indicated by the arrow Z from a release position, in which the clamping member is disengaged from the elongate member 20 and a clamping position, in which the clamping member 10 clamps the elongate member 20 against the first wall 32.

The angled second wall 34 urges the clamping member onto the elongate member 20 so that a clamping force is applied on the elongate member 20. The engaging surface 14 of the clamping member 10 engages the elongate member 20 and the elongate member 20 is clamped between the first wall 32 and the clamping member 10. The first wall 32 acts to provide a reaction force against clamping force applied by the clamping member 10 onto the elongate member 20.

The engaging surface 14 has gripping formations in the form of a plurality of serrations 38. The serrations 38 extend one after another along the length of the engaging surface 14, and each serration 38 extends laterally across the engaging surface 14. The serrations 38 provide enhanced grip between the clamping member 10 and the elongate member 20 compared with a smooth engaging surface 14.

In addition to the serrations 38, the engaging surface 14 also has two preliminary engaging projections 40 at the rear region 10B of the clamping member 10. The preliminary engaging projections 40 are provide to engage the elongate member 20 before the serrations 38, to provide purchase onto the elongate member 20 to prevent it from slipping before the elongate member 20 is engaged by the serrations 38.

It is desirable that clamping member 10 moves with the elongate member 20 during clamping of the elongate member 20 against the first wall 32. It is also desirable that the elongate member 20 can move relative to the clamping device 18 during the clamping of the elongate member onto the first wall.

In order to ensure that the clamping member 10 moves with the elongate member 20, the engaging surface 14 is provided with the aforesaid gripping formations in the form of the serrations 38. In order to ensure that the elongate member 20 can move relative to the clamping device 18, the first wall 32 is made to be smooth, to allow the elongate member 20 to slide over the first wall 32 until the elongate member 20 has been clamped thereto by the clamping member 10.

Figure 3:
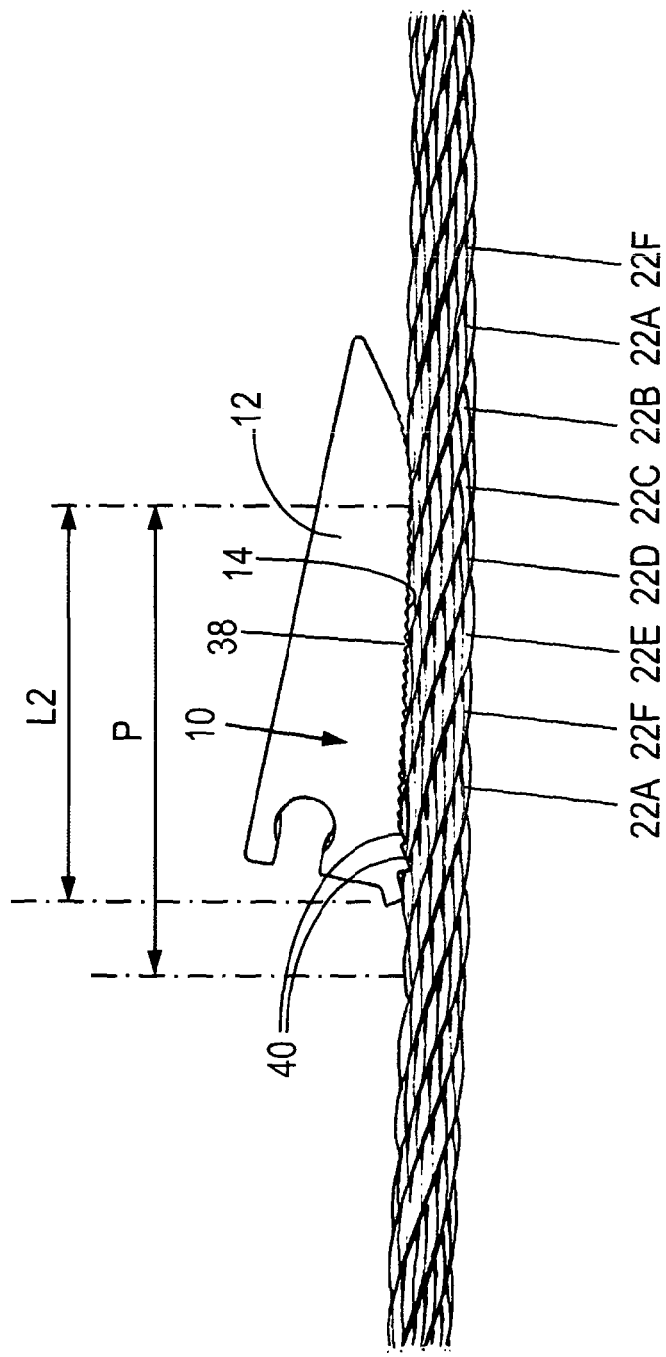
FIG. 3 is a side view of the clamping member shown in FIG. 1 in engagement with an elongate member.

The elongate member shown in FIG. 2 is a simplified representation of the elongate member, which is shown more clearly in FIG. 3, and now described.

The elongate member 20 comprises six strands 22A, 22B, 22C, 22D, 22E and 22F. The strands 22A to 22F are helically wound around one another in a plurality of turns of each strand 22A to 22F. Each of the strands 22A to 22F has a pitch P. The elongate member 20 has a longitudinal main axis XX. The pitch P is the distance along the main axis XX of the elongate member 20 of one complete turn of one of the strands 22A to 22F. In FIG. 3, the pitch of the strand 22A is shown, but it will be appreciated that the pitch of each other strand 22B to 22F is the same.

The clamping member 10 has a length L1 extending from the front region 10A to the rear region 10B. The engaging surface has a length L2, which is between approximately three fifths and approximately three quarters of the length L1 of the clamping member 10.

The front region 10A of the clamping member 10 has a curved leading surface 10C, which curves convexly from the front end region 10A to the engaging surface 14. The curved leading surface 10C facilitates movement of the clamping member 10 along the passage 26 in engagement with the elongate member 20. The curved leading surface 10C extends between approximately one quarter and approximately one third of the length L1 of the clamping member 10.

The length L2 of the engaging surface 14 is also shown in FIG. 3 and as can be seen, the whole length of the engaging surface 14 engages each of the strands 22A to 22F. This means that, in use, when a clamping member 10 having an engaging surface 14 of length L2 is used to clamp an elongate member 20 formed of six strands 22A to 22F, each having a pitch P, each of the strands 22A to 22F is engaged by the clamping member 10 and by the first wall 32.

It has been discovered that instead of engaging all six strands 22A to 22F, the clamping member 10 can engage only three of the strands, say 22A to 22C. With such engagement, the remaining strands 22D to 22F are in engagement with the first wall 32 at points that are directly opposite the points of engagement of the strands 22A to 22C with the engagement surface 14.

Thus, when the engaging surface 14 engages the three strands 22A, 22B and 22C, and applies a clamping force to the strands 22A, 22B and 22C, the region of the first wall 32 in alignment with the clamping surface 14 engages the other three strands 22D to 22F, and the first wall 32 applies a reaction force to each of the strands 22D, 22E, 22F.

Figure 4:
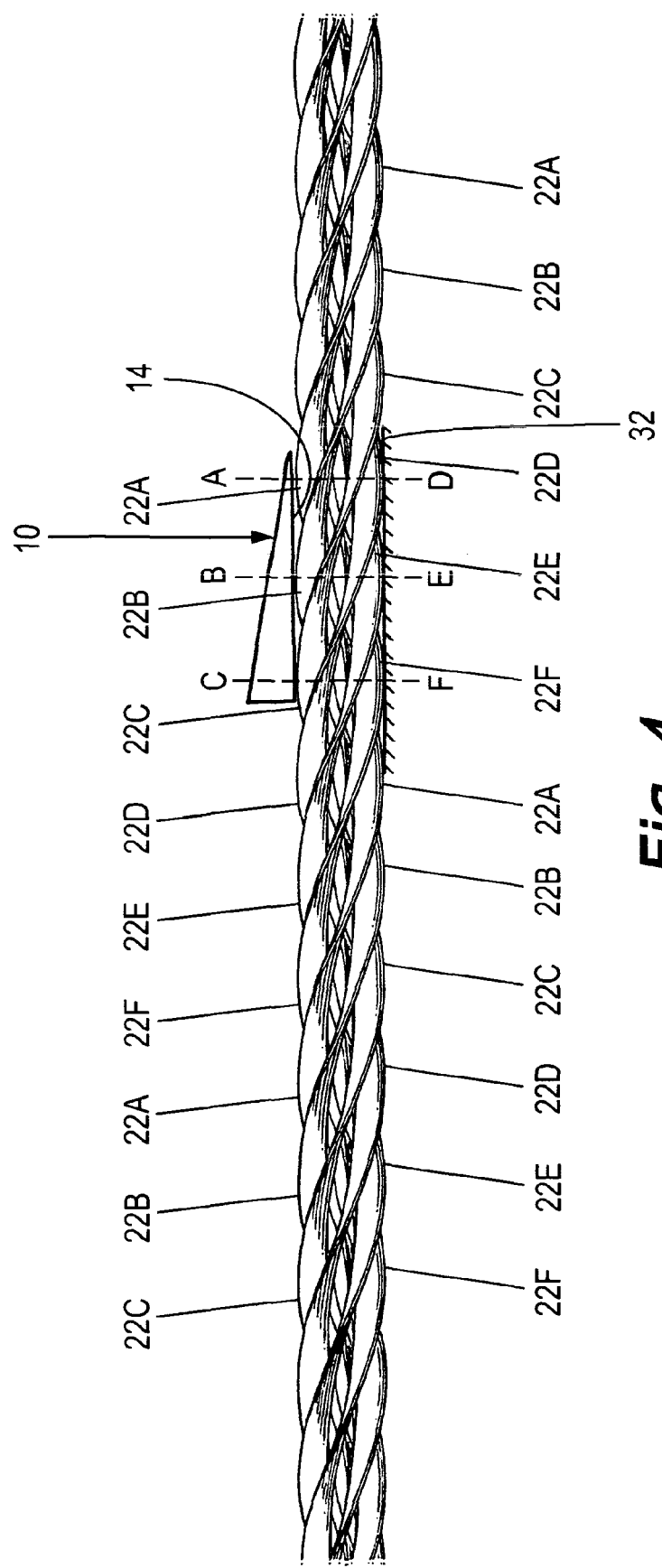
FIG. 4 is a diagrammatic view of an elongate member.

The arrangement of the strands 22A to 22F is shown more clearly in FIG. 4, which is a diagrammatic representation of an elongate member 20. Each of the strands 22A to 22F is shown partially spaced from the other strands so that they can be seen more clearly. Where the engaging surface 14 of the clamping member 10 extends along the three strands 22A, 22B and 22C, the wall 32 engages the other three strands 22D, 22E and 22F. The broken lines A-D, B-E, and C-F show the points on the respective strands 22A and 22D, 22B and 22E, 22C and 22F that are opposite each other and hence engaged by either the clamping member 10 or the region of the first wall 32 aligned with the engaging surface 14.

Thus, with the use of a clamping member 10 with an engaging surface 14 that extends across three of the strands 22A to 22F, all of the strands are clamped by the clamping member 10 against the first wall 32.

FIG. 5 shows an example of a clamping arrangement 100 comprising the features of the clamping arrangement 100 described above. The features shown in FIG. 5 have the same reference numerals as the corresponding features shown in FIGS. 1 to 4. The clamping device 18 shown in FIG. 5 also includes a release member for releasing the clamping member 10 from the elongate member 20.

In the embodiment shown in FIG. 5, the release member comprises a screw 50 threadably secured to the rear region 10B of the clamping member 10. The clamping member 10 can be moved to its release position by pulling the screw 50 in the direction indicated by the arrow Y.

The embodiment of the clamping device 18 shown in FIG. 5 has securing formations 52 to secure the clamping device 18 to a further article (not shown). Each securing formation 52 comprises a wing member 54 defining an aperture 56. Each wing member 54 extends outwardly form the housing 24 on opposite sides thereof. A fastening member such as a bolt can be received through each aperture 56 to secure the clamping device 18 to the article.

There is thus described a clamping member 10 that has an engaging surface 14 that is of such a length that all of the strands of a multi-strand elongate member 20 can be clamped by a clamping device. There is also described a clamping arrangement and a clamping device 18 that enables an elongate member to be clamped more firmly than prior art clamping devices, and reduces the risk of such clamping cutting through the elongate member 20.

Various modifications can be made without departing from the scope of the invention.

The invention claimed is:

1. A clamping arrangement comprising:
   an elongate member having a plurality of strands wound around one another in a plurality of turns of each of said strands, wherein each of said strands has a pitch, which is the same as the pitch of each other of said strands;
   a clamping device comprising a clamping member for clamping the elongate member, the clamping member having an engaging surface with gripping formations for engaging the elongate member, wherein the clamping member comprises a front region and a rear region, the front region leading the rear region when the clamping member is urged into engagement with the elongate member;
   the clamping member further including a preliminary engaging projection at the rear region to initially engage the elongate member;
   the clamping device further comprising a reaction member comprising a first wall, and a reaction element comprising a second wall, the first and second walls being arranged opposite each other to define a passage for the clamping member, and the clamping device further comprising urging means to urge the clamping member along the passage towards the reaction member;
   wherein the first wall is smoother than the engaging surface;
   wherein, when the elongate member is received between the clamping member and the first wall, the first wall engages the elongate member and provides a reaction against the elongate member, and the second wall urges the clamping member onto the elongate member, so that a clamping force is applied on the elongate member;
   and wherein the engaging surface is configured to engage half or more of the total number of strands forming the elongate member, and the engaging surface has a length which is equal to 67% or more of the pitch of said strands.

2. A clamping arrangement according to claim 1, wherein the engaging surface is configured to engage two thirds or more of the total number of strands forming the elongate member.

3. A clamping arrangement according to claim 1, wherein the engaging surface is configured to engage three quarters or more of the total number of strands forming the elongate member.

4. A clamping arrangement according to claim 1, wherein the length of the engaging surface is substantially equal to 75% or more of the pitch of said strands.

5. A clamping arrangement according to claim 1, wherein the length of the engaging surface is substantially equal to 100% or more of the pitch of said strands.

6. A clamping arrangement according to claim 1, wherein the clamping member is in the form of an elongate wedge, and the front region is thinner than the rear region.

7. A clamping arrangement according to claim 6, wherein the front region of the clamping member is convexly curved to facilitate engagement of the engaging surface with the elongate member, said curvature extending from the front region to the engaging surface.

8. A clamping arrangement according to claim 7, wherein the curvature of the front region extends between approximately one quarter and approximately one third of the length of the clamping member.

9. A clamping arrangement according to claim 7, wherein the preliminary engaging projection comprises a tooth on the engaging surface.

10. A clamping arrangement according to claim 7, wherein the clamping member comprises a plurality of the aforesaid preliminary engaging projections, each preliminary engaging projection comprising a respective tooth.

11. A clamping arrangement according to claim 1, wherein the engaging surface has an engaging length which is between approximately three fifths and approximately three quarters of the length of the clamping member.

12. A clamping arrangement according to claim 1, wherein the clamping member is movable between a clamping position and a release position, the engaging surface being configured to grip the elongate member when the clamping member is in the clamping position, and the reaction member being configured to allow adjustment of the position of the elongate member relative thereto when the clamping member is in the release position.

13. A clamping arrangement according to claim 1, wherein the clamping device comprises a housing defining the passage, the clamping member being arranged in the housing, and each wall being part of the housing.

14. A clamping arrangement according to claim 13, wherein the first wall is fixed relative to the housing to provide the reaction against the elongate member received in the passage when the clamping member is urged along the passage to clamp the elongate member, and wherein the first and second walls are arranged opposite one another and angled towards one another.

15. A clamping arrangement according to claim 1, wherein the clamping device defines a pair of the passages and a pair of the clamping members, each clamping member being associated with a respective one of the passages, and the clamping device further comprising a pair of urging means, each of which is arranged to urge a respective one of the clamping members towards the passage with which it is associated.

16. A clamping arrangement according to claim 15, wherein the clamping device comprises a single reaction member associated with both passages, the reaction member having two surfaces, and each surface providing a reaction against a respective elongate member in each passage.

17. A clamping arrangement according to claim 15, wherein the clamping device comprises two of the aforesaid reaction members, each being associated with a respective one of the passages.

* * * * *